United States Patent
McNally et al.

(10) Patent No.: US 6,665,798 B1
(45) Date of Patent: Dec. 16, 2003

(54) SYSTEM FOR ASSIGNING DATA PROCESSING ACTIVITIES TO USERS THROUGH AN INTERACTIVE DISPLAY INTERFACE DYNAMICALLY GRANTING ACCESS ONLY DURING ACTIVITY TO NORMALLY INACCESSIBLE RESOURCES NEEDED FOR ACTIVITY

(75) Inventors: Michael R. McNally, Austin, TX (US); John William Sweitzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,185

(22) Filed: Apr. 27, 2000

(51) Int. Cl.$^7$ ............................................. G06F 17/00
(52) U.S. Cl. ...................... 713/200; 713/201; 713/150; 713/151
(58) Field of Search ........................ 713/100, 150–155, 713/182–187, 200–202; 380/255–257

(56) References Cited

U.S. PATENT DOCUMENTS 6,606,711 B2 * 8/2003 Andrews et al. ............ 713/201
6,609,198 B1 * 8/2003 Wood et al. ................. 713/200
6,609,200 B2 * 8/2003 Anderson et al. ........... 713/155

OTHER PUBLICATIONS

Weiss, When a password is not a password, Security Technology, 1990, Cirme Countermeasures, Proceedings, IEEE 1990, International Carnahan Conference on Oct. 10–12, 1990, pp. 100–108.*

Moir, An implementation of access control using a salient feature of primes, Computer Security Applications Conference, 1991, Proceedings, Seventh Annual, Dec. 2–6, 1991, pp. 56–64.*

Evetts, Automatic test system critical computer resource software (AMSSS): a journey toward an integrated digital environment, AUTOTESTCON '99, IEEE Systems Readiness Technology Conference, 1999, IEEE, Aug. 30–Sep. 2, 1999, pp. 93–97.*

* cited by examiner

*Primary Examiner*—David Jung
(74) *Attorney, Agent, or Firm*—J. B. Kraft; Leslie A. Van Leeuwen

(57) ABSTRACT

A method for limiting access to the proprietary resources of an outsourcer or distributor to the participants/operators having assigned outsourced activities requiring such resources. Access is limited only to the assigned activity execution and prevented from misuse of the resources for unauthorized purposes. Reliable tracking of the lent out resources is provided and access is terminated simply when the associated activity has been completed. An implementation is provided for assigning performable activities to a user or operator together with interactively displaying in association with each activity, the computer resources needed to carry out the respective activity in combination with means, responsive to said assigning means, for granting to said operator through this interactive display, access to the computer resources needed to carry out said assigned performable activity only during the carrying out of said activity, whereby the displayed resource is removed from the display and, thus, becomes inaccessible upon the completion of the activity.

18 Claims, 7 Drawing Sheets

SYSTEM FOR ASSIGNING DATA PROCESSING ACTIVITIES TO USERS THROUGH AN INTERACTIVE DISPLAY INTERFACE DYNAMICALLY GRANTING ACCESS ONLY DURING ACTIVITY TO NORMALLY INACCESSIBLE RESOURCES NEEDED FOR ACTIVITY

CROSS-REFERENCE TO RELATED APPLICATIONS

The following patent application, having the same inventorship, assigned to the assignee of the present invention and filed concurrently herewith, covers subject matter related to the subject matter of the present invention: "A WORKFLOW DISTRIBUTION PROCESS GRANTING TO OPERATORS WITH ASSIGNED ACTIVITIES ACCESS TO NEEDED COMPUTER RESOURCES AND WITHDRAWING SUCH ACCESS UPON THE COMPLETION OF THE ASSIGNED ACTIVITY", Ser. No. 09/561,186.

1. Technical Field

The present invention relates to data processing work distribution and particularly to the protection of the computer resources of the distributer used in executing and carrying out work activities assigned to operators remote from distributer or sender of the work request.

2. Background of Related Art

The 1990's have been marked by a technological revolution driven by the convergence of the data processing industry with the consumer electronics industry. The effect has, in turn, driven technologies which have been known and available but relatively quiescent over the years. A major one of these technologies is the Internet or World Wide Web (Web) related distribution of documents, programs, media and all other data processing entities. The convergence of the electronic entertainment and consumer industries with data processing exponentially accelerated the demand for wide ranging communication distribution channels and the Web or Internet, which had quietly existed for over a generation as a loose academic and government data distribution facility, reached "critical mass" and commenced a period of phenomenal expansion.

As a result of this expansion, extraordinary worldwide communication channels and resources have become available to businesses, and this has commenced an era which will forever change how business processes are conducted. Through the use of networks such as the Internet, business processes of different companies often handle each others' requests with little or no human intervention; little human interaction is required to have one business process talk to another business process of a different company. Another related trend has been that of businesses outsourcing various data processor controlled tasks or activities to contractor or subcontractor individuals or organizations. As a result of Internet functions and capabilities, the outsource participants may be in different cities or countries. Often, routine outsourcing of activities may be done automatically with a minimum of human intervention or control.

However, this outsourcing or like collaboration between different organizations and companies requires the sharing of resources such as business processes and databases. Each outsourcing company often has to make available to one or more of the others, proprietary databases, application programs and other resources which the others may need to complete their activity. These other participants are likely to either be competitors or associated with competitors in many other business areas. Thus, the outsourcing of work activities and tasks presents many problems to the company or organization which is outsourcing or distributing the work. How does a distributor insure that the proprietary resources lent to outside participants or operators which are performing specified activities are not also being misused for other unauthorized purposes? Because more and more of activity distribution and outsourcing may be done routinely and automatically with a minimum of human intervention, how can the distributor track what has been lent out and insure that access to these proprietary resources are terminated when their associated activity has been completed?

SUMMARY OF THE PRESENT INVENTION

The present invention provides a method and system for limiting access to the proprietary resources of an outsourcer or distributor to the participants/operators having assigned outsourced activities requiring such resources. The invention limits the access only to the assigned activity execution and prevents the misuse of the resources for unauthorized purposes. The invention also provides for reliable tracking of the lent out resources and insures that access is terminated simply when the associated activity has been completed.

In its broadest aspects, the present invention provides a computer controlled interactive display system for assigning, e.g. .outsourcing, data processing activities to the participant/operators through interactive display interfaces accessed by the operators. Means are provided at the distributor level for selecting a plurality of operator performable activities to be outsourced, and predetermining for each performable activity one or more computer resources needed to carry out each performable activity but normally inaccessible to the participant/operator to whom the activity is assigned.

Means are provided for assigning performable activities to a user or operator together with means for interactively displaying in association with each activity, the computer resources needed to carry out the respective activity in combination with means, responsive to said assigning means, for granting to said operator through this interactive display, access to the computer resources needed to carry out said assigned performable activity only during the execution of said activity, whereby the displayed resource is removed from the display and, thus, becomes inaccessible upon the completion of the activity.

In addition, there may be provided to each of the operators access to a plurality of basic computer resources without limitation to any assigned activity so that the computer resources made accessible to operators for carrying out said assigned activities boost the resources provided to the respective operators. This basic set of resources is available to the operator irrespective of any assigned activities and is displayed as a basic set of elements, each representing a basic computer resource selectively accessible by said operator.

The present invention may most effectively be used where the activities are distributed over the Internet with the distributor or outsourcer at a sending station and the participants or operators at receiving display stations. In such an arrangement, the assigned activity may be sent in the form of electronic mail. The assigned activities and attendant designated resources could be conveniently displayed at a receiving display station in the form of an inbox display listing said assigned activity, and the system further includes means for activating said assigned activity to thereby interactively display the designated resources needed to carry out said assigned activity.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
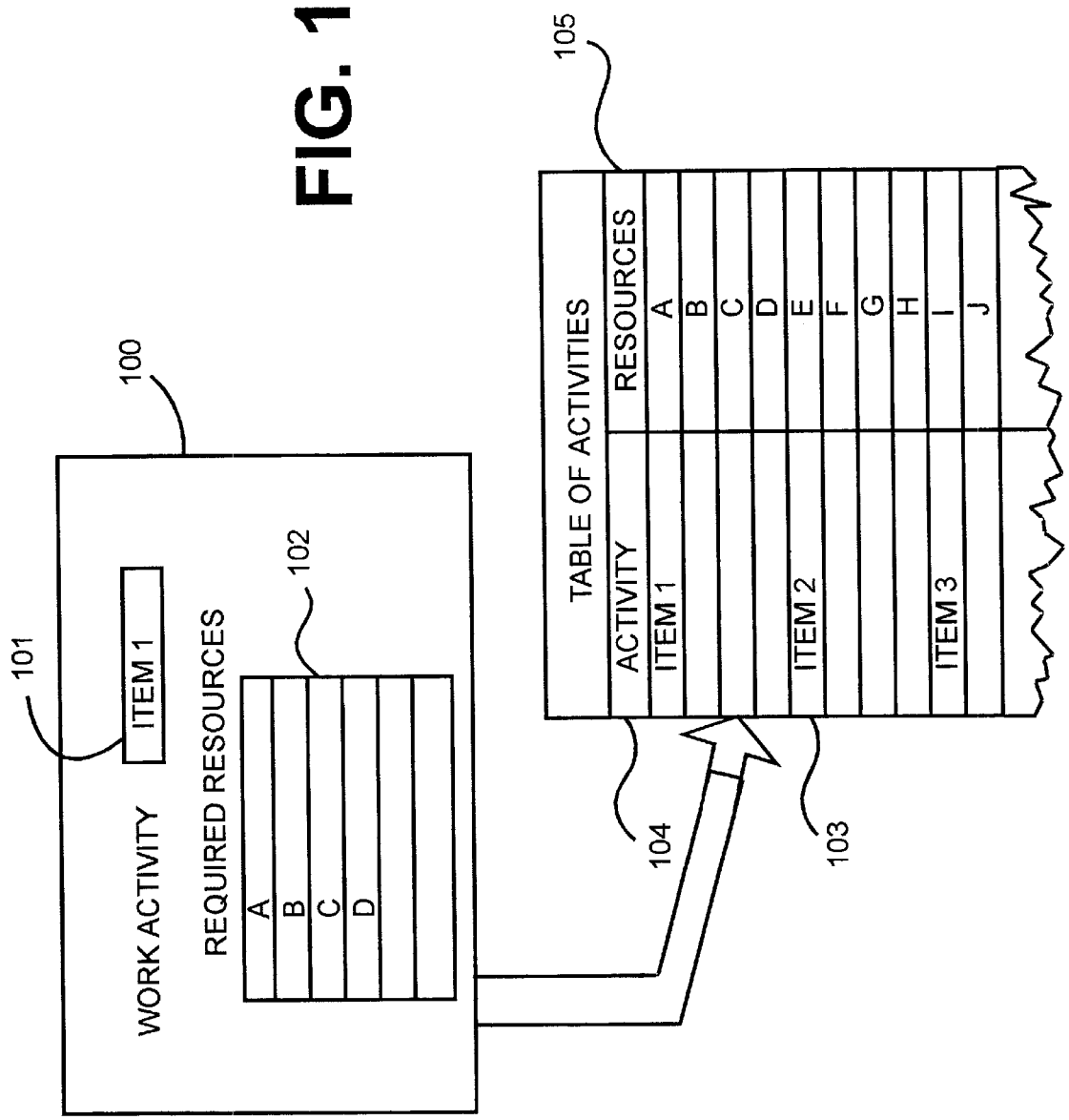
FIG. 1 is a diagram of an interactive display screen on which the developer or distributer of work may select activities and predetermine for the activity, the access to which resources of the distributor will be designated for the operator only during execution of the assigned activities; these are stored in a table relating activities with resources.

FIG. 1 is a diagrammatic view of an illustrative display screen interface which may be used by a business company distributor to preset the activities which may be distributed or outsourced to potential contractors who will complete the work. The display interface 100 includes data entry fields 101 for identifying the activity. The distributor must then predetermine the proprietary resources of his company which the participant or contractor-operator will need to execute the activity. He then enters these required resources in field 102 and these are stored in a table of activities 103 in which the predetermined resources 105 required to complete each activity are associated with that activity 104.

Figure 2:
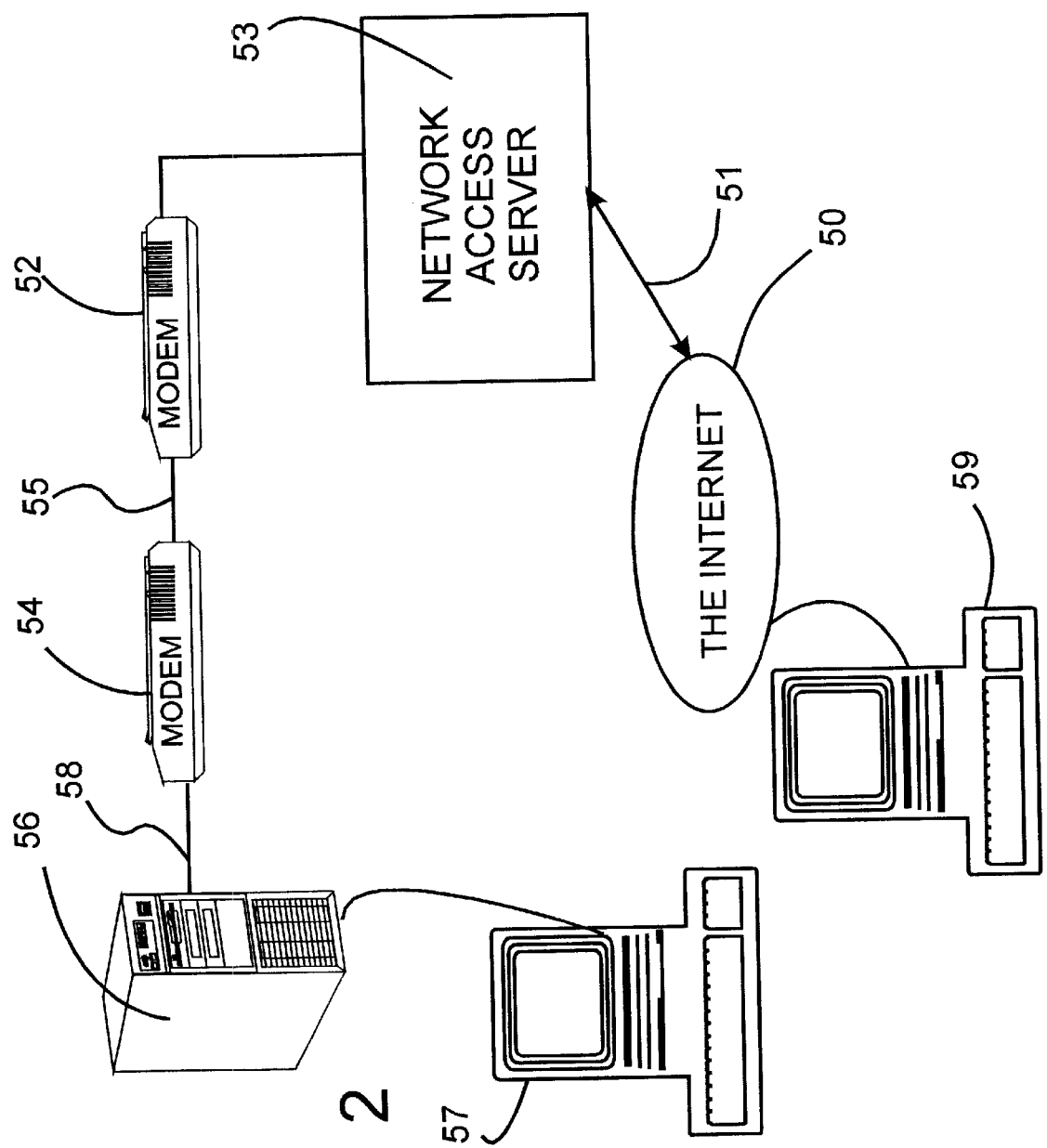
FIG. 2 is an illustrative diagram of a portion of the Internet showing a distributor source station for sending an activity and a receiving display station on which the activity may be executed.

We have indicated that a preferred process for sending or distributing the activities to be executed would be over a network such as the Internet. FIG. 2 shows a simplified portion of the Internet to illustrate the Internet functions in such a distribution. The distributor which is developing the work activities for distribution as set forth in FIG. 1 operates through workstation 57. The distribution management is handled through server computer 56; the table setting up the resources which are needed for each distributed activity (Table 103, FIG. 1) is conveniently stored in connection with server 56. Sending computer terminal 57 and server 56 are connected to the Internet via connector 58. Reference may be made to the text, *Mastering the Internet*, G. H. Cady et al., published by Sybex Inc., Alameda, Calif., 1996, pp. 136–147, for typical connections between local display workstations to the Internet.

The system embodiment of FIG. 2 is one of these known as a host-dial connection. Such host-dial connections have been in use for over 30 years through network access servers 53 which are linked 51 to the Internet 50. The servers 53 are maintained by a service provider to the distributor client's display terminal 57 and managing server 56. The host's server 53 is accessed through a normal dial-up telephone linkage 58 via modem 54, telephone line 55 and modem 52. For simplicity in illustration, only one typical receiving display terminal 59 on which the participant operator will execute the sent activity is shown. It should be understood that many receiving terminals 59 would of course be available on the Internet for distributing work activities in accordance with the present invention. Also, receiving terminal 59 would be connected to the Internet through a similar modem to modem connection which is not shown.

Figure 3:
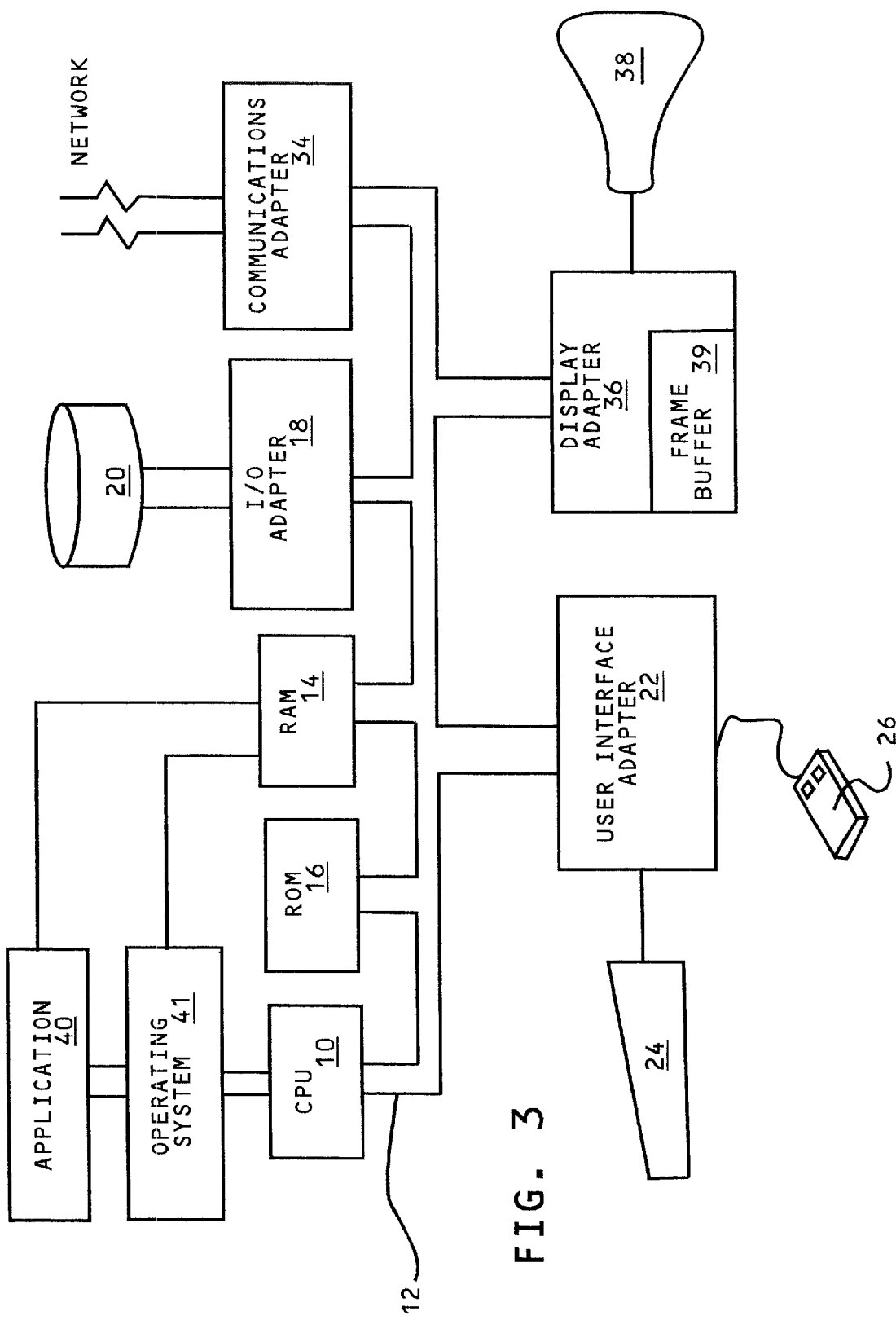
FIG. 3 is a block diagram of a data processing system including a central processing unit and network connections via a communications adapter which is capable of functioning as the source or sending display terminal of FIG. 2, as well as the receiving display stations used by the operators or participants to execute their assigned activities.

Referring to FIG. 3, a typical computer controlled display system is shown which may function as the computer controlled display terminal 57 (FIG. 2) of the distributor or Internet station used as any of the receiving stations 59 for the participant's executing activities. The system shown may also be used for the management server 56 used in controlling the distribution and execution of assigned activities.

A central processing unit (CPU) 10, may be one of the commercial PC microprocessors; when the system shown is used by the work distributor or developer or as the server computer for managing the running or distribution of work activities to participants, then a workstation is preferably used, e.g. RISC System/6000™ (RS/6000) series available from International Business Machines Corporation (IBM). The CPU is interconnected to various other components by system bus 12. An operating system 41 runs on CPU 10, provides control and is used to coordinate the function of the various components of FIG. 3. Operating system 41 may be one of the commercially available operating systems such as the AIX 6000™ operating system available from IBM; Microsoft's Windows 98™ or Windows NT™, as well as UNIX and AIX operating systems. Application programs 40, controlled by the system, are moved into and out of the main memory Random Access Memory (RAM) 14. These programs include the programs of the present invention for controlling the allocation or designation of resources to participants or operators who are carrying out the assigned activities requiring such resources. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with the outside network enabling the computer system to communicate with other such computers over a Local Area Network (LAN) or through the Web or Internet. I/O devices are also connected to system bus 12 via user interface adapter 22 and display adapter 36. Keyboard 24 and mouse 26 are all interconnected to bus 12 through user interface adapter 22. It is through such input devices that the distributor/developer at his workstation or participant/operators at receiving display stations may interactively relate to the network in order to access assigned activities and the resources designated or permitted to the operator in the execution of such activities. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

FIGS. 4 through 7 are diagrammatic illustrations of the display screens which may be presented to the participants or operators executing assigned activities during the execution of such activities. As set forth above, electronic mail over the Internet is the preferred distribution medium.

Figure 4:
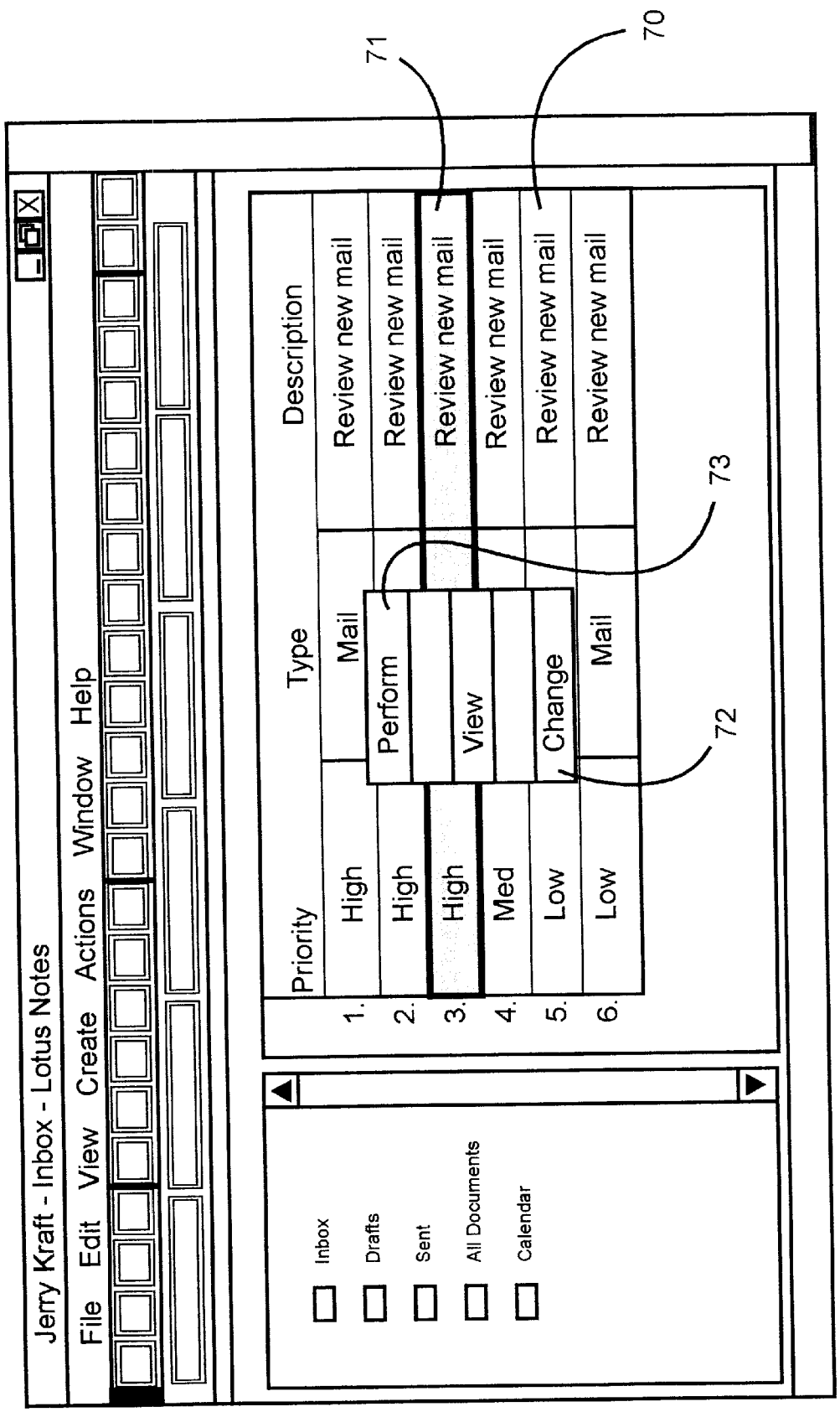
FIG. 4 is a diagram of an interactive display screen of a typical electronic mail inbox interface on a receiving network display terminal on which activities are sent to operators as electronic mail.
Figure 5:
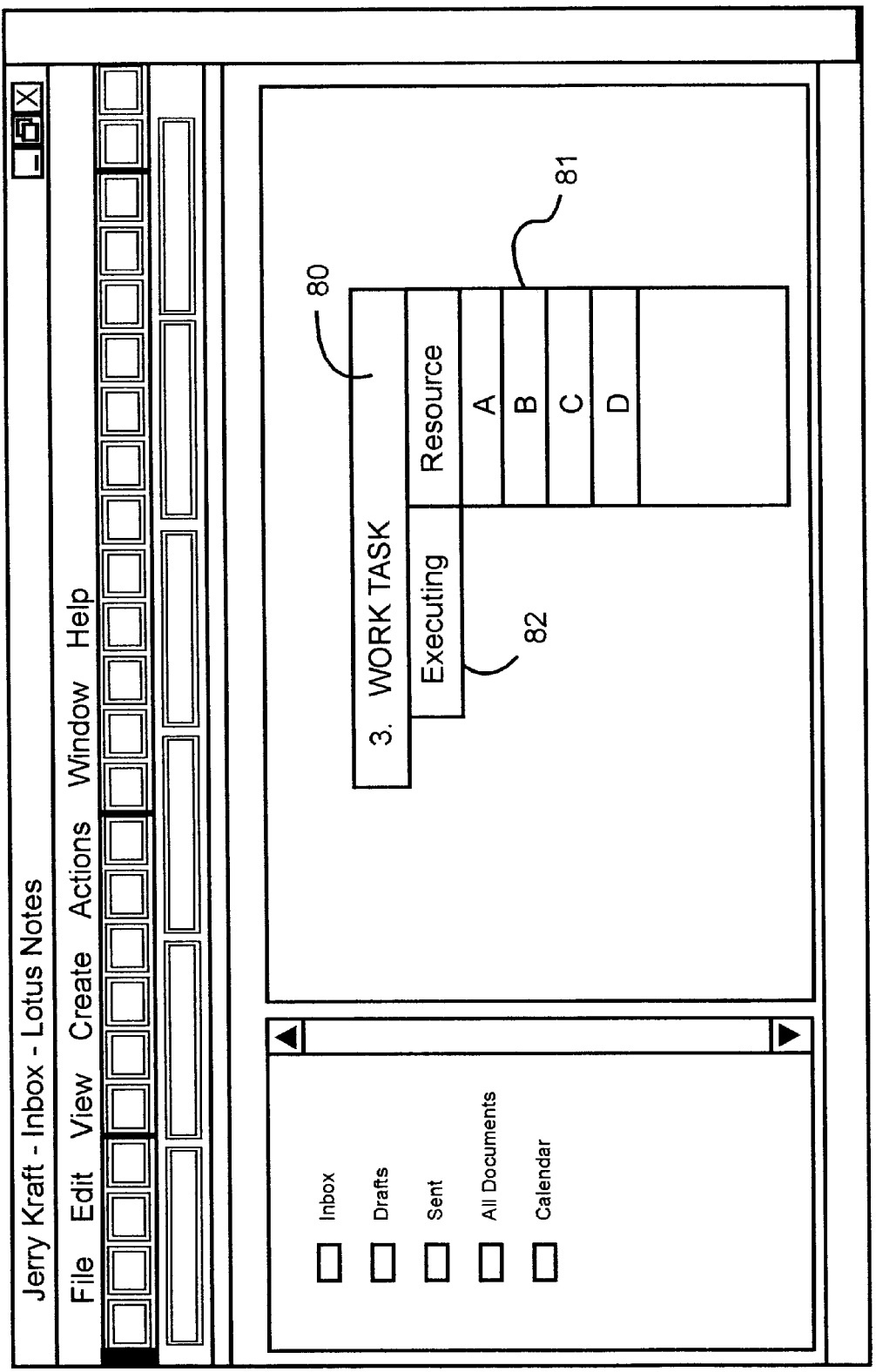
FIG. 5 is the display screen of FIG. 4 after the operator has selected and commenced the execution of a selected activity or task.
Figure 6:
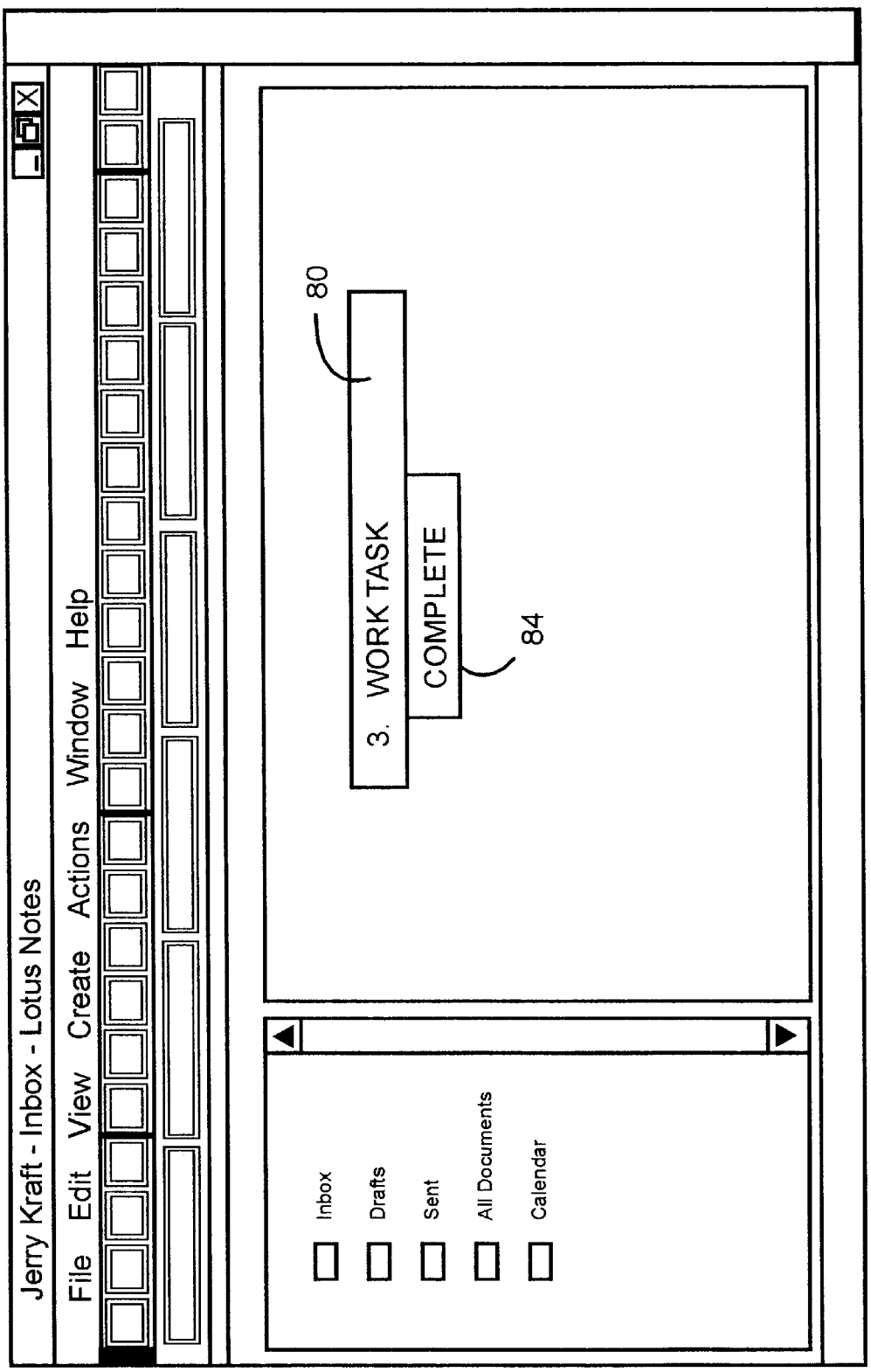
FIG. 6 is the display screen of FIG. 5 after the operator has completed the execution of activity of FIG. 5.

FIG. 4 shows a simplified display interface 70 which could be presented to an operator on his receiving display for a particular work activity. Since the activity has been sent by mail over the Internet, it is listed in this mailbox interface (inbox) with other e-mail. In the display shown, the operator has selected mail item 3, so it is highlighted 71. Also, menu 72 has dropped down and the operator has chosen to perform, indicating that he is ready to perform, the e-mailed assigned activity. This results in a change to the display screen of FIG. 5. This screen lists the activity (Work Task) 80; the status of the activity, i.e. executing 82, and an interactive list 81 of items A–D which are the proprietary resources of the activity distributor which have been designated for use by the operator in his execution of the assigned activity. The operator may interactively access any of resources A–D through this interface as needed during the execution of the activity. Upon the completion of the activity 80, the display screen shown in FIG. 6 appears in which the activity 80 is indicated as complete 84, and the list of resources A–D has been removed so that the resources are secure in that they can no longer be accessed by the operator for any other purpose.

As should be clear from this example, the distribution of the assigned activity along with the accessible resources for its execution by this e-mail inbox interface is simple, easy to use and understand by the operator/participant. If appropriate, the access to resources may be an e-mail attachment. Since the display interface is the only limited access route to the resource, the access may be limited in scope even during the execution of the activity requiring the resource access and once the activity is complete, access to the resource is immediately cut off through the removal of the interface.

Figure 7:
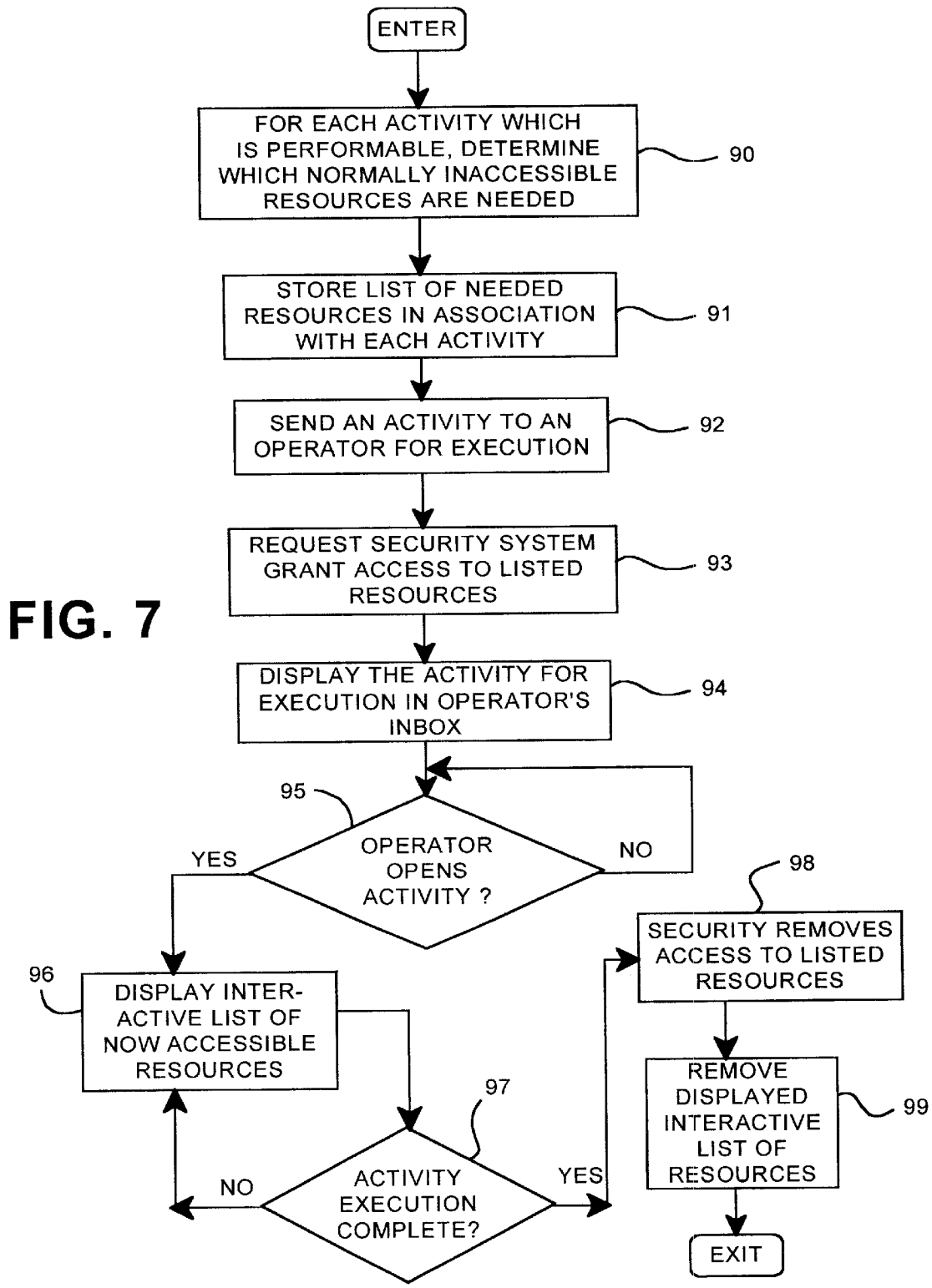
FIG. 7 is a flowchart of an illustrative run of the distribution and completion of activities in the work distribution process according to the present invention.

Now with reference to the flowchart of FIG. 7, a simplified illustrative run of a process of activity distribution will be described. The developer or distributor of the activities predetermines for each activity which is performable by a potential participant operator, those proprietary resources of the distributor which would normally be inaccessible to the operator but which the operator will need in order to execute and complete the activity, step 90. A list or table of each performable activity and its necessary resources is stored, step 91. When an activity is sent to an operator for execution, step 92, the activities distribution management requests that the security system for the operation grant to the operator access to the predetermined and listed resources for the execution of that activity, step 93. In this connection, any conventional security system usable for work distribution processes may be implemented to provide security. In general, the process may conveniently use the security systems available in the operating systems being used for the network server and client computers where the workflow is being distributed. Next, the activity which may conveniently be sent through the Internet e-mail is listed in the operator's e-mail inbox (FIG. 4), step 94. When the operator opens the listed activity, as determined by step 95, then the interface displays the interactive list of resources accessible only during the execution of the activity, step 96 (the display of FIG. 5). The activity execution is monitored to determine when it is complete, step 97. When the activity is completed, security removes access to the listed resources, step 98, and the displayed interactive list of accessible resources is removed from the display, step 99 (the display interface of FIG. 6), and the process is exited.

A convenient implementation of the present invention is in an application program 40 made up of programming steps or instructions resident in RAM 14, FIG. 3, of the management server computer during various operations or in the distributor's sending computer. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled interactive display system for assigning data processing activities to users through display interfaces comprising:

means for selecting a plurality of user performable activities, means for predetermining for each performable activity, at least one normally inaccessible computer resource needed to carry out each performable activity, means for interactively displaying in association with each of said user performable activity, the at least one computer resource needed to carry out the respective activity, means for assigning a performable activity to a user, and means, responsive to said assigning means, for granting to said user through said means for interactively displaying, access to the at least one computer resource needed to carry out said assigned performable activity only during the carrying out of said activity, whereby said resource becomes inaccessible upon the completion of said activity.

2. The system of claim 1, further including:

means for providing to said user access to a plurality of basic computer resources without limitation to any assigned performable activity, and whereby the computer resources made accessible to said user for carrying out said assigned activity boost the resources provided to the respective operators.

3. The system of claim 2 wherein said means for providing said basic computer resources include means for displaying a basic set of elements each representing a basic computer resource selectively accessible by said user.

4. In a network including a plurality of interconnected computer controlled display stations for receiving and sending data, a system for assigning data processing activities to users at receiving display stations comprising:

means for selecting a plurality of user performable activities, means for predetermining for each performable activity, at least one normally inaccessible computer resource needed to carry out each performable activity, means for assigning a performable activity to a user, and means for sending to said user at a receiving display station, data representative of said assigned activity including:

means for accessing said computer resource needed to carry out said assigned activity by interactively displaying said resource at said receiving display station in association with said assigned activity, only during the carrying out of said activity, whereby said resource becomes inaccessible upon the completion of said activity.

5. The network system of claim 4 wherein said network is the Internet, and said means for sending said data to said user is through electronic mail.

6. The network system of claim 5 wherein:

said means for interactively displaying said resource at the receiving display station is in the form of an inbox display listing said assigned activity, and further including means for activating said assigned activity to thereby interactively display said at last one resource needed to carry out said assigned activity.

7. A computer controlled interactive display method for assigning data processing activities to users through display interfaces comprising:

selecting a plurality of user performable activities, predetermining for each performable activity, at least one normally inaccessible computer resource needed to carry out each performable activity, interactively displaying in association with each of said user performable activities, the at least one computer resource needed to carry out the respective activity, assigning a performable activity to a user, and granting to said user through said interactively displaying, access to the at least one computer resource needed to carry out said assigned performable activity only during the carrying out of said activity, whereby said resource becomes inaccessible upon the completion of said activity.

8. The method of claim 7, further including the step of:

providing to said user access to a plurality of basic computer resources without limitation to any assigned performable activity, and whereby the computer resources made accessible to said user for carrying out said assigned activity boost the resources provided to the respective operators.

9. The method of claim 8 wherein said step of providing said basic computer resources includes displaying a basic set of elements each representing a basic computer resource selectively accessible by said user.

10. In a network including a plurality of interconnected computer controlled display stations for receiving and sending data, a method for assigning data processing activities to users at receiving display stations comprising:

selecting a plurality of user performable activities, predetermining for each performable activity, at least one normally inaccessible computer resource needed to carry out each performable activity, assigning a performable activity to a user, and sending to said user at a receiving display station, data representative of said assigned activity including:

accessing said computer resource needed to carry out said assigned activity by interactively displaying said resource at said receiving display station in association with said assigned activity, only during the carrying out of said activity, whereby said resource becomes inaccessible upon the completion of said activity.

11. The method of claim 10, wherein said network is the Internet, and said means for sending said data to said user is through electronic mail.

12. The method of claim 11 wherein:

said step for interactively displaying said resource at the receiving display station is displayed the form of an inbox display listing said assigned activity, and said method further includes the step of activating said assigned activity to thereby interactively display said at least one resource needed to carry out said assigned activity.

13. A computer program having program code included on a computer readable medium operable in a computer controlled interactive display system for assigning data processing activities to users through display interfaces comprising:

means for selecting a plurality of user performable activities, means for predetermining for each performable activity, at least one normally inaccessible computer resource needed to carry out each performable activity, means for interactively displaying in association with each of said user performable activities, the at least one computer resource needed to carry out the respective activity, means for assigning a performable activity to a user, and means, responsive to said assigning means, for granting to said user through said means for interactively displaying, access to the at least one computer resource needed to carry out said assigned performable activity only during the carrying out of said activity, whereby said resource becomes inaccessible upon the completion of said activity.

14. The computer program of claim 13, further including:

means for providing to said user access to a plurality of basic computer resources without limitation to any assigned performable activity, and whereby the computer resources made accessible to said user for carrying out said assigned activity boost the resources provided to the respective operators.

15. The computer program of claim 14 wherein said means for providing said basic computer resources include means for displaying a basic set of elements each representing a basic computer resource selectively accessible by said user.

16. A computer program having program code included on a computer readable medium, operable in a network including a plurality of interconnected computer controlled display stations for receiving and sending data, for assigning data processing activities to users at receiving display stations comprising:

means for selecting a plurality of user performable activities, means for predetermining for each performable activity, at least one normally inaccessible computer resource needed to carry out each performable activity, means for assigning a performable activity to a user, and means for sending to said user at a receiving display station, data representative of said assigned activity including:

means for accessing said computer resource needed to carry out said assigned activity by interactively displaying said resource at said receiving display station in association with said assigned activity, only during the carrying out of said activity, whereby said resource becomes inaccessible upon the completion of said activity.

17. The computer program of claim 16, wherein said network is the Internet, and said means for sending said data to said user is through electronic mail.

18. The computer program of claim 17 wherein:

said means for interactively displaying said resource at the receiving display station is in the form of an inbox display listing said assigned activity, and further including means for activating said assigned activity to thereby interactively display said at least one resource needed to carry out said assigned activity.

* * * * *